Jan. 14, 1958  J. R. SNYDER  2,819,680
PUMP MOUNTING FOR A SYNTHETIC RUBBER FUEL CELL
Filed April 29, 1954  2 Sheets-Sheet 2
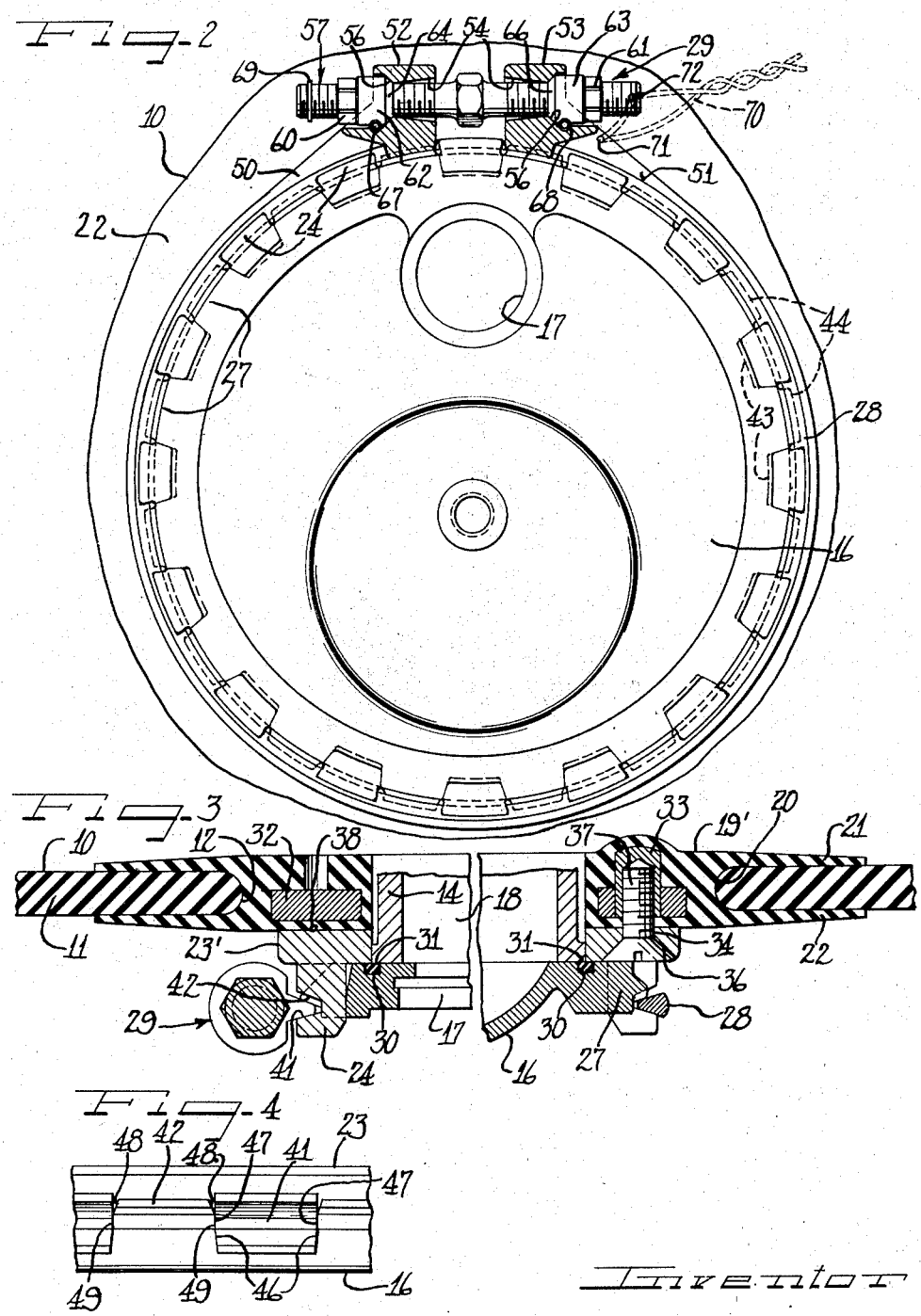
Inventor
Jacob Rush Snyder

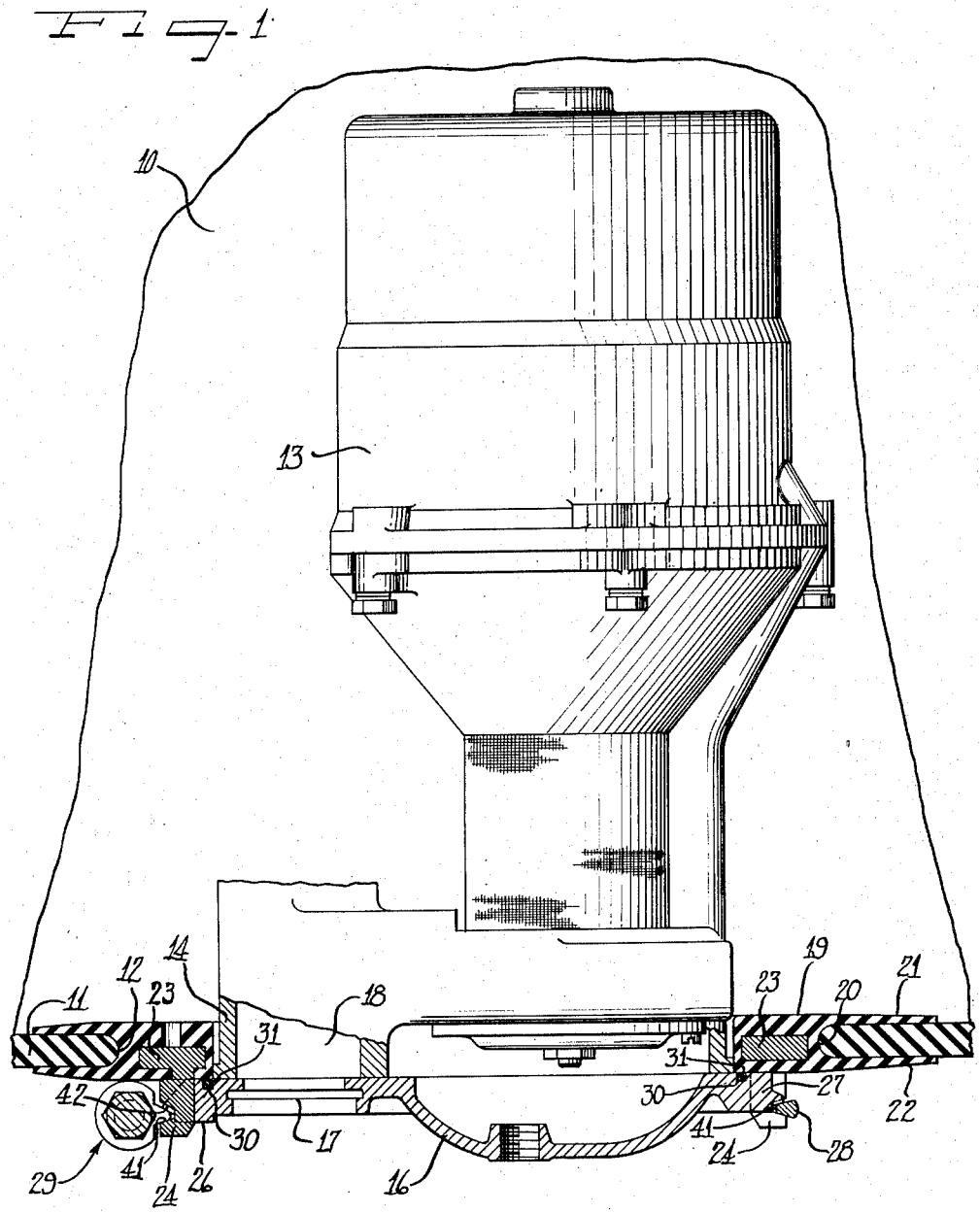

2,819,680

PUMP MOUNTING FOR A SYNTHETIC RUBBER FUEL CELL

Jacob Rush Snyder, Cleveland, Ohio, assignor to Thompson Products, Inc., Cleveland, Ohio, a corporation of Ohio Application April 29, 1954, Serial No. 426,450

12 Claims. (Cl. 103—218)

This invention relates generally to mounting structures for submerged type pumps located interiorly of a fuel cell and more particularly relates to a quick attaching device for clamping a submerged type pump in mounted relationship on a synthetic rubber fuel cell.

Submerged type pumps are frequently mounted in fuel cell constructions by means of clamping arrangements which utilize a plurality of circumferentially spaced fastening means such as screws or the like cooperable with clamping bands located on opposite sides of the edges of an opening formed in the walls of a fuel cell. For example, as many as fifteen to twenty separate mounting screws may be required, thereby involving a considerable amount of time in the event replacement of a pump unit in a fuel cell is required. Moreover, there is always the possibility of losing one or more of the fastening screws and there is the further possibility that haste on the part of the operator might cause damage to the thread of one or more of the screws or the parts cooperable therewith.

In accordance with the principles of the present invention, the pump head and the edges of the fuel cell opening are provided, respectively, with mating lock ring members cooperable with a turn buckle type adjusting screw so that the pump may be attached or detached in only a fraction of the time previously required with conventional fastening and mounting arrangements.

It is an object of the present invention, therefore, to provide a quick attaching device for a fuel cell pump mounting structure.

Another object of the present invention is to provide a pump mounting for a fuel cell which utilizes a reduced number of simplified parts.

Yet another object of the present invention is to provide a pump mounting arrangement which will be self-supporting even though incompletely coupled so that the operator can conveniently make adjustments toward a permanently locked position with maximum convenience.

A further object of the present invention is to provide a quick attaching mechanism for a fuel cell pump mounting arrangement which may be conveniently used with existing fuel cell structures.

Many other advantages, features and additional objects of the present invention will become manifest to those versed in the art upon making reference to the detailed description which follows and the accompanying sheets of drawings in which preferred structural embodiments of a pump mounting arrangement for a synthetic rubber fuel cell is shown by way of illustrative example.

On the drawings:

Figure 1 is an elevational view of a submerged type pump mounted inside of a fuel cell in accordance with the principles of the present invention;

Figure 2 is an end elevational view of the structure shown in Figure 1 showing the mounting arrangement;

Figure 3 is cross-sectional view, broken in part showing an alternative form of fastening means provided in accordance with the principles of the present invention; and Figure 4 is a fragmentary peripheral view of the clamping ring portion of the quick attaching device with the clamping ring removed to illustrate additional details of construction.

As shown in the drawings:

In accordance with the principles of the present invention, a fuel cell 10 made out of synthetic rubber or some other suitable material is provided with a bottom wall 11 having an opening 12 formed therein.

A submerged type pump 13 extends through said opening 12 and is mounted so as to be submerged inside of the fuel cell 10. It will be understood that the principles of the present invention are not specifically dependent upon any particular pump details and, accordingly, for the purposes of the present disclosure the pump 13 is identified as a submerged booster pump having a booster pump end frame 14 and including a pump head indicated at 16.

The pump head 16 has an outlet opening 17 formed therein communicating with a passage 18 provided by the booster pump end frame 14. In accordance with the usual practice, the structure may be equipped for either inside or outside fuel delivery by either closing the outlet opening 17 or by connecting a conduit thereto for carrying fuel acted upon by the pump 13 to a point of utilization.

To facilitate assembly of the pump 13 to the fuel cell 10 in accordance with the principles of the present invention, a mounting ring structure is connected to the fuel cell for cooperation with components of the pump structure.

Referring first of all to the embodiment of Figures 1 and 2, the mounting ring structure comprises a body portion 19 which takes the configuration of a disc or an annular ring member made of a molded resilient material such as synthetic rubber or the like. The body portion 19 is peripherally grooved as at 20 thereby to provide an upper peripheral flange 21 and a lower peripheral flange 22, both of which peripheral flanges extend circumferentially to overlap the inside surface and the outside surface, respectively, of the bottom wall 11 of the fuel cell 10 at the edges of the opening 12. The peripheral groove 20 is shaped complementally to the edges of the bottom wall 11 at the opening 12 so as to receive the edges in snug relationship for keeping the body portion 19 in firm assembly with the bottom wall 11 of the fuel cell 10.

A rigid annular ring member 23 made of a suitable metal or other rigid material is integrally embedded within the body portion 19 and includes a plurality of circumferentially spaced axially extending fingers 24 which project outwardly of the body portion 19 from the underside thereof and beyond the outside surface of the lower wall 11 of the fuel cell 10.

The pump head 16 has a radially outwardly extending circumferential mounting flange 26 which is located outside of the fuel cell 10 constituting a second ring member and shaped to provide a plurality of circumferentially spaced fingers 27 to interlock with the fingers 24 on the ring 23. Thus, the interlocking fingers 24 and 27 constitute lock rings which are engaged by a clamping ring 28 actuated by a turnbuckle type screw indicated generally at 29 so that the pump 13 may be attached or detached to the fuel cell 10 in only a fraction of the time previously required with conventional pump mounting arrangements.

The upper surface of the pump head 16 is particularly characterized by the provision of an annular groove 30 seating an O ring seal member 31 which, in turn, engages the lower surface of the body portion 19 to provide a seal between the pump head 16 and the body portion 19.

The embodiment of Figure 3 is very similar to the embodiment already described except the axially projecting fingers 24 are carried on a rigid ring 23' which is located wholly outside of the body portion 19' of the mounting ring structure.

Integrally embedded within the body portion 19' is an annular disc 32 carrying a plurality of circumferentially spaced threaded inserts 33. The rigid ring 23' is provided with a corresponding plurality of openings 34 counterbored as at 36 to pass and receive a corresponding plurality of flush-type fastening screws 37 each threaded into a corresponding insert 33 for retaining the rigid ring 23' in firm assembly with the body portion 19'.

It may be further noted that the rigid ring 23' is provided with an annular upstanding bead 38 which is formed on the inner face of the rigid ring 23' and which engages the resilient surface of the body portion 19' to definitely prevent fuel leakage between the body portion 19' and the rigid ring 23'.

In view of the similarity in structure between the embodiments of Figures 1 and 3, like reference numerals have been applied wherever possible.

The ring 23 or 23' which is assembled to the fuel cell 10 may be considered a base ring part and it may be noted that the circumferentially spaced fingers 24 provided thereby have peripheral grooves 41 extending therethrough. As is clearly shown in the drawings, the grooves 41 have wedge-shaped tapering side walls. The clamping ring 28 fits within the grooves 41 of the fingers 24 and is retained therein against axial displacement.

The fingers 27 of the pump head 16 fit between the fingers 24. Each finger 27 has an out-turned lug 42 on the end thereof. The lugs 42 project radially outward to a diameter which is less than the diameter of the outer ends of the fingers 24. Therefore, the lugs 42 terminate radially inward from the outer ends of the grooved fingers. Each lug 42 has opposed converging abutment faces providing a leading face for guiding the lug under the clamping ring 28 and a trailing face for forming an abutment surface aligned with an intermediate portion of the adjoining finger grooves 41. This abutment face is thus offset from the tapered side walls of the adjoining grooves 41 so that when the clamping ring 28 is tightened a wedging action will be exerted on the abutment face to create an axial load drawing the pump head tightly against the fuel cell mounting ring structure.

To further facilitate alignment of the rigid ring 23 or 23' and the pump head 16 as they are brought together, the rigid ring 23 or 23' has tapered peripheral shoulders 43 (Figure 2) between the fingers 24 thereof for guiding the fingers 27 thereover into the spaces between the fingers 24. Likewise, the pump head 16 has tapered shoulders 44 for guiding the fingers 24 of the rigid ring thereover into the spaces between the fingers 27. These tapered shoulders 43 and 44 diverge outwardly to cylindrical flat circumferential walls in seating engagement with the inner faces of the respective fingers when the parts are coupled together.

As is best shown in Figure 4, the fingers 24 have tapered or beveled sides 46 at their leading ends which diverge to flat axially extending sides 47. The fingers 27 have similar beveled leading side edges 47 diverging to flats 49. The flat side walls 47 and 49 are in close fitting relation to provide a torsional interlock of the ring parts but the tapered narrower leading ends of the fingers afford easily assembly and serve to guide the fingers into their mated splined relationship.

The turnbuckle unit 29 for the clamping ring 28 includes a pair of brackets 50 and 51 brazed or otherwise secured over the end portions of the clamping ring 28. Each bracket has an upstanding hollow head indicated at 52 and 53, respectively. Each head has a tapered bore 54 converging from the opposing faces of the heads to spherically concave recesses 56 in the outer faces thereof.

A draw bolt 57 has a shank freely fitting through the tapered bores 54 and the recesses 56 of the heads 52 and 53. An end abutment for the draw bolt 57 may be provided at opposite ends by lock nut members indicated at 60 and 61, respectively. There is further provided a pair of nuts 62 and 63 each having a spherically convex end face 64 and 66, respectively, seated in a corresponding recess 56 of the head portions 52 and 53. Roll pins indicated at 67 and 68 are provided between the nuts 62 and 63 and the head portions 52 and 53. A limiting lock ring 69 is located on the end of the draw bolt 57 to prevent operation of the turnbuckle unit 29 for expansion of the clamping ring 28 to a point where the clamping ring 28 could possibly be forced over the fingers of the flange provided by the rigid ring 23 or 23'. In this connection, it may be noted that the fingers 24 are radially longer than the fingers 27 so that the clamping ring 28 will remain permanently with the rigid ring 23 or 23'. The fingers 27, however, freely slip through the clamping ring 28 when it is expanded to a detached position.

In applying the pump 13 to an attaching position, the fingers 27 will snap through and into engagement with the clamping ring 28 and will be self-supporting so that the operator, at his convenience, can wrench the turnbuckle adjusting screw or draw bolt 57 to a permanently locked position with great convenience and facility. Inasmuch as the nuts 62 and 63 are self-locking and are held against rotating and thrust action by means of their respective seats and the roll pins 67 and 68, the clamping ring 28 will automatically align and firmly fasten the respective parts with only a single hand operation.

If desired, the adjusting screw or draw bolt 57 may be locked wired in position and in Figure 2 a lock wire is indicated in dash lines at 70, appropriate apertures being provided in the bracket 51 at 71 and in the adjusting screw or draw bolt 57 at 72.

Although minor structural modifications might be suggested by those versed in the art, it should be understood that I wish to embody within the scope of the patent warranted hereon all such modifications as reasonably and properly come within the scope of my contribution to the art.

I claim as my invention:

1. In combination, means forming a fuel cell having a wall formed with an opening therein, a pump extending through said opening and into the inside of said fuel cell, a pump head member on said pump outside of said fuel cell, and a mounting ring connected to said fuel cell circumjacent said opening, said mounting ring and said pump head member providing first and second ring members, respectively, said first and second ring members having radially outwardly extending inter-fitted fingers offset axially from said mounting ring and a clamping ring surrounding said fingers including a turnbuckle adjusting screw to lock said pump in firm assembly with the walls of said fuel cell.

2. In combination, means forming a fuel cell having a wall formed with an opening therein, a pump extending through said opening and into the inside of said fuel cell, a pump head member on said pump outside of said fuel cell, and a mounting ring connected to said fuel cell circumjacent said opening, said mounting ring and said pump head member providing first and second ring members, respectively, said first and second ring members projecting axially of said mounting ring and having radially outwardly extending inter-fitted fingers and a clamping ring surrounding said fingers including a turnbuckle adjusting screw to lock said pump in firm assembly with the walls of said fuel cell, said mounting ring more particularly comprising a body portion made of molded resilient material and being peripherally grooved to provide annular circumferential flanges snapping over opposite sides of the fuel cell wall at the edges of said opening to place said ring in firm assembly with said fuel cell.

3. In combination, means forming a fuel cell having a wall formed with an opening therein, a pump extending through said opening and into the inside of said fuel cell, a pump head member on said pump outside of said fuel cell, and a mounting ring connected to said fuel cell circumjacent said opening, said mounting ring and said pump head member providing first and second ring members, respectively, said first and second ring members having radially outwardly extending inter-fitted fingers offset axially from said mounting ring and a clamping ring surrounding said fingers including a turnbuckle adjusting screw to lock said pump in firm assembly with the walls of said fuel cell, said mounting ring more particularly comprising a body portion made of molded resilient material and being peripherally grooved to provide annular circumferential flanges snapping over opposite sides of the fuel cell wall at the edges of said opening to place said ring in firm assembly with said fuel cell, and a rigid ring member having fastening means embedded in said body member and fasteners connecting said first and second ring members to said rigid ring.

4. In combination, means forming a fuel cell having a wall formed with an opening therein, a pump extending through said opening and into the inside of said fuel cell, a pump head member on said pump outside of said fuel cell, and a mounting ring connected to said fuel cell circumjacent said opening, said mounting ring and said pump head member providing first and second ring members, respectively, said first and second ring members having radially outwardly extending inter-fitted fingers offset axially from said mounting ring and a clamping ring surrounding said fingers including a turnbuckle adjusting screw to lock said pump in firm assembly with the walls of said fuel cell, said mounting ring more particularly comprising a body portion made of molded resilient material and being peripherally grooved to provide annular circumferential flanges snapping over opposite sides of the fuel cell wall at the edges of said opening to place said ring in firm assembly with said fuel cell, and a rigid ring member having fastening means embedded in said body member, said rigid ring member and said fastening means comprising a disc carrying a plurality of circumferentially spaced threaded inserts respectively, and a screw for each insert threaded thereinto and retaining said first and second ring members, in firm assembly with said body member.

5. A pump mounting structure for a fuel cell comprising, means forming a fuel cell having a wall formed with an opening therein, a pump extending through said opening inside of said fuel cell and having a pump head member outside of said fuel cell, and a mounting ring connected to said fuel cell circumjacent said opening, said mounting ring and said pump head member providing first and second ring members, respectively, said first ring member having an annular row of circumferentially spaced radially outwardly extending peripheral fingers, each finger having a lateral groove formed therein to provide wedge-shaped tapering side walls converging radially inwardly, a clamping ring having complementary wedge-shaped tapering side walls retained in said lateral grooves of said fingers against axial displacement, said second ring member having an annular row of circumferentially spaced fingers fitting between said fingers on said first ring member and including lugs projecting radially outwardly from said fingers to a diameter less than the outer diameter of the fingers on said first ring member, each of said lugs having opposed converging abutment surfaces providing a leading face for guiding the lug axially under the clamping ring and a trailing face aligned with an intermediate portion of the adjoining laterally grooved fingers on said first ring member and co-operating with said clamping ring to draw the first and second ring members together axially when the clamping ring is tightened radially.

6. A pump mounting structure for a fuel cell comprising, means forming a fuel cell having a wall formed with an opening therein, a pump extending through said opening inside of said fuel cell and having a pump head member outside of said fuel cell, and a mounting ring connected to said fuel cell at said opening, said mounting ring and said pump head member providing first and second ring members, respectively, said first ring member having an annular row of circumferentially spaced peripheral fingers, each finger having a lateral groove formed therein to provide wedge-shaped tapering side walls converging radially inwardly, a clamping ring having complementary wedge-shaped tapering side walls retained in said lateral grooves of said fingers against axial displacement, said second ring member having an annular row of circumferentially spaced fingers fitting between said fingers on said first ring member and including lugs projecting radially outwardly from said fingers to a diameter less than the outer diameter of the fingers on said first ring member, each of said lugs having opposed converging abutment surfaces providing a leading face for guiding the lug axially under the clamping ring and a trailing face aligned with an intermediate portion of the adjoining laterally grooved fingers on said first ring member and cooperating with said clamping ring to draw the first and second ring members together axially when the clamping ring is tightened radially, one of said ring members having axially outwardly tapered peripheral shoulders between the fingers thereof for guiding the fingers on the other of said ring members thereover into the spaces between the fingers on said one of said ring members.

7. A pump mounting arrangement for a fuel cell comprising, means forming a fuel cell having a wall formed with an opening therein, a pump extending through said opening inside of said fuel cell and having a pump head member outside of said fuel cell, and a mounting ring connected on said fuel cell at said opening, said mounting ring and said pump head member providing first and second ring members, respectively, said first ring member having an annular row of circumferentially spaced peripheral fingers, each finger having a lateral groove formed therein to provide wedge-shaped tapering side walls converging radially inwardly, a clamping ring having complementary wedge-shaped tapering side walls retained in said lateral grooves of said fingers against axial displacement, said second ring member having an annular row of circumferentially spaced fingers fitting between said fingers on said first ring member and including lugs projecting radially outwardly from said fingers to a diameter less than the outer diameter of the fingers on said first ring member, each of said lugs having opposed converging abutment surfaces providing a leading face for guiding the lug axially under the clamping ring and a trailing face aligned with an intermediate portion of the adjoining laterally grooved fingers on said first ring member and cooperating with said clamping ring to draw the first and second ring members together axially when the clamping ring is tightened radially, both of said ring members having axially extending tapered shoulders between the respective mating fingers for guiding the corresponding respective mating fingers into interfitting relationship with one another.

8. A pump mounting arrangement for a fuel cell comprising, means forming a fuel cell having a wall formed with an opening therein, a pump extending through said opening inside of said fuel cell and having a pump head member outside of said fuel cell, and a mounting ring connected to said fuel cell at said opening, said mounting ring and said pump head member providing first and second ring members, respectively, said first ring member having an annular row of circumferentially spaced peripheral fingers, each finger having a lateral groove formed therein to provide wedge-shaped tapering side walls converging radially inwardly, a clamping ring having complementary wedge-shaped tapering side walls retained in said lateral grooves of said fingers against axial displacement, said second ring member having an annular row of circumferentially spaced fingers fitting between said fingers on said first ring member and including lugs projecting radially outwardly from said fingers to a diameter less than the outer diameter of the fingers on said first ring member, each of said lugs having opposed converging abutment surfaces providing a leading face for guiding the lug axially under the clamping ring and a trailing face aligned with an intermediate portion of the adjoining laterally grooved fingers on said first ring member and cooperating with said clamping ring to draw the first and second ring members together axially when the clamping ring is tightened radially, both of said ring members having axially extending tapered shoulders between the respective fingers thereof for guiding the corresponding respective mating fingers into interfitting relationship with one another, said tapered shoulders diverging outwardly to cylindrical flat circumferential walls in seating engagement with the inner faces of the respective fingers when the first and second ring members are coupled together.

9. A pump mounting arrangement for a fuel cell comprising, means forming a fuel cell having a wall formed with an opening therein, a pump extending through said opening inside of said fuel cell and having a pump head member outside of said fuel cell, and a mounting ring connected to said fuel cell at said opening, said mounting ring and said pump head member providing first and second ring members, respectively, said first ring member having an annular row of circumferentially spaced peripheral fingers, each finger having a lateral groove formed therein to provide wedge-shaped tapering side walls converging radially inwardly, a clamping ring having complementary wedge-shaped tapering side walls retained in said lateral grooves of said fingers against axial displacement, said second ring member having an annular row of circumferentially spaced fingers fitting between said fingers on said first ring member and including lugs projecting radially outwardly from said fingers to a diameter less than the outer diameter of the fingers on said first ring member, each of said lugs having opposed converging abutment surfaces providing a leading face for guiding the lug axially under the clamping ring and a trailing face aligned with an intermediate portion of the adjoining laterally grooved fingers on said first ring member and cooperating with said clamping ring to draw the first and second ring members together axially when the clamping ring is tightened radially, a draw bolt assembly on said clamping ring, and means to adjust said draw bolt assembly for firmly fastening the respective parts with a single hand operation.

10. In combination, means forming a fuel cell having a wall formed with an opening therein, a submerged type of pump extending inside of said fuel cell through said opening, a pump mounting fitting comprising an annular ring made of a molded resilient material, a peripheral groove being formed in said annular ring and receiving said walls of said fuel cell at the edges of said opening, a first rigid ring member outside of said fuel cell having fastening means integrally embedded in said annular ring and carried in firm assembly by said pump mounting fitting, said pump having a pump head mounting flange outside of said fuel cell providing a circumferentially peripheral portion constituting a second ring member, and a turnbuckle assembly having a clamping ring engaging said first and second rings to retain said pump in firm assembly with the walls of said fuel cell.

11. A pump mounting arrangement for a submerged pump inside of a fuel cell, comprising, a first ring carried by a wall of a fuel cell and a second ring carried by the pump, both of said rings providing radially outwardly extending circumferentially spaced peripherally grooved fingers outside of the fuel cell, and a clamping ring engaging said fingers and having a turnbuckle connection at the ends thereof to collapse said clamping ring radially and to thereby connect said pump in sealed assembly with said fuel cell.

12. In combination, means forming a fuel cell having a wall providing an opening adjacent submerged type pump inside of said cell, said pump and the edges of said fuel cell wall at said opening being providing, respectively, with mating lock ring members, and a turnbuckle type adjusting screw operatively connecting said ring members for quick assembly of said pump in said fuel cell.

References Cited in the file of this patent

UNITED STATES PATENTS

| | | |
|---|---|---|
| 1,882,616 | Hutchinson | Oct. 11, 1932 |
| 2,139,370 | Lauer | Dec. 6, 1938 |
| 2,326,263 | Steiner | Aug. 10, 1943 |
| 2,439,161 | Du Bois | Apr. 6, 1948 |
| 2,697,570 | Snyder | Dec. 21, 1954 |
| 2,731,278 | Soderstrom | Jan. 17, 1956 |